United States Patent
Harakawa

(10) Patent No.: US 10,348,129 B2
(45) Date of Patent: Jul. 9, 2019

(54) ELECTRIC POWER SUPPLY SYSTEM

(71) Applicant: ExH Corporation, Chiba (JP)

(72) Inventor: Kenichi Harakawa, Chiba (JP)

(73) Assignees: EXH CORPORATION, Chiba (JP); TOYO ALUMINIUM K.K., Osaka (JP); SUMIDA CORPORATION, Tokyo (JP)

( * ) Notice: Subject to any disclaimer, the term of this patent is extended or adjusted under 35 U.S.C. 154(b) by 68 days.

(21) Appl. No.: 15/550,303

(22) PCT Filed: Feb. 10, 2016

(86) PCT No.: PCT/JP2016/053978
§ 371 (c)(1),
(2) Date: Dec. 26, 2017

(87) PCT Pub. No.: WO2016/129638
PCT Pub. Date: Aug. 18, 2016

(65) Prior Publication Data
US 2018/0138743 A1    May 17, 2018

(30) Foreign Application Priority Data
Feb. 10, 2015  (JP) .................................. 2015-024504

(51) Int. Cl.
*H02J 50/05*    (2016.01)
*H05H 1/46*    (2006.01)
*H05H 1/24*    (2006.01)

(52) U.S. Cl.
CPC ............... *H02J 50/05* (2016.02); *H05H 1/46* (2013.01); *H05H 2001/2412* (2013.01); *H05H 2001/4682* (2013.01)

(58) Field of Classification Search
CPC ... H02J 50/05; H05H 1/46; H05H 2001/2412; H05H 2001/4675; H05H 2001/4682
(Continued)

(56) References Cited

U.S. PATENT DOCUMENTS

2012/0247390 A1    10/2012   Sawada
2013/0154480 A1*    6/2013   Choi .................. H05H 1/46
                                                315/111.51
(Continued)

FOREIGN PATENT DOCUMENTS

JP    09093704    4/1997
JP    2009-089520 A    4/2009
(Continued)

OTHER PUBLICATIONS

Tsuyoshi Sekitani et al., "A large-area wireless power-transmission sheet using printed organic transistors and plastic MEMS switches," nature materials, vol. 6, Jun. 2007, pp. 413-417.

*Primary Examiner* — William Hernandez
(74) *Attorney, Agent, or Firm* — Muncy, Geissler, Olds & Lowe, P.C.

(57) ABSTRACT

An electric power supply system, to which the electric field coupling electric power transmission technology is applied, includes an electric power transmission electrode for transmitting electric power from an electric power source, an electric power reception electrode that is disposed so as to contactlessly face the electric power transmission electrode to form a junction capacitance, and receives the electric power transmitted from the electric power transmission electrode through the junction capacitance, and a plasma generation unit for generating a plasma in a space between the electric power transmission electrode and the electric power reception electrode in which the junction capacitance is formed.

6 Claims, 11 Drawing Sheets

(58) Field of Classification Search
USPC .................................. 307/9.1, 10.1, 104, 109
See application file for complete search history.

(56) References Cited

U.S. PATENT DOCUMENTS

| | | | |
|---|---|---|---|
| 2013/0171038 A1* | 7/2013 | Choi | B01J 19/12 422/186.03 |
| 2014/0263181 A1* | 9/2014 | Park | C23C 16/45557 216/68 |
| 2015/0097480 A1* | 4/2015 | Chung | H01J 37/3211 315/34 |

FOREIGN PATENT DOCUMENTS

| | | |
|---|---|---|
| JP | 2009089520 | 4/2009 |
| JP | 2011-086912 A | 4/2011 |
| JP | 201186912 | 4/2011 |

* cited by examiner

ELECTRIC POWER SUPPLY SYSTEM

TECHNICAL FIELD

The present invention relates to an electric power supply system for supplying electric power to various kinds of loads.

BACKGROUND ART

In general, electric power supply systems for supplying power to various kinds of loads arranged on a floor surface can be broadly classified into contact-type power supply systems which supply power by bringing the electrodes provided so as to be exposed on the floor surface into contact with the electrodes provided on the bottom surface of the load; and noncontact-type power supply systems which supply power without bringing the electrodes provided in a non-exposed matter inside of the floor into contact with the electrodes of the load.

Among them, a conventional noncontact-type electric power supply system is disclosed in Patent Document 1, for example. This system performs electric power supply to a load (ground mobile body) that moves along a guideway, and is configured to arrange an induction line along the guideway, as well as provide an iron core around which a coil is wound to the ground mobile body. Further, a high-frequency electric current is passed through the induction line so as to perform electromagnetic induction, in which this induction line is set as a primary side, and the coil is set as the secondary side, thereby supplying power to the ground mobile body.

As another noncontact-type electric power supply system, a wireless electric power transmission sheet is disclosed in Non-Patent Document 1. With the use of printing technology, this wireless electric power transmission sheet is configured by forming, on a plastic film, coils for power transmission, MEMS (Micro Electro Mechanical Systems) switches for electric power control, position detection coils for an electric power reception device, and organic transistors for performing position detection with the use of the position detection coils. In this wireless power-transmission sheet, the organic transistor detects a change in the inductance of the position detection coil which accompanies the approaching of an electronic device to the sheet, thereby specifying the approach position of the electronic device. Then, the power transmission coil corresponding to the identified position is selected by the MEMS switch to transmit electric power from the selected power transmission coil.

However, with such a conventional noncontact-type power supply system, there are many limitations in terms of the position, such as it is necessary to align the induction line and the coil so as to bring the induction line and the coil into proximity with each other and to cause the magnetic flux generated by energization of the induction line to pass through the central axis of the coil, in order to raise the power transmission efficiency. Therefore, there have been problems in that it is only possible to supply power along a fixed path such as a guideway, and it is not possible to supply power to a mobile body such as a robot that is required to freely move on the floor surface. In addition, there have been problems in that it is required to use a magnetic body such as an iron core in order to form a magnetic path, and thus the weight increases, and when the magnetic body is excited by alternating current, magneto-striction occurs and generates noise. In addition, in order to enhance the electric power transmission efficiency with the conventional wireless electric power transmission sheet, it is necessary to align the position of the electric power transmission coil and the position of the electric power reception coil of the electronic device, and nonetheless has many limitations in terms of the position. Furthermore, since many switches are used, there has been a possibility of the reliability declining. Other than the above, it may be possible to consider supplying power with electromagnetic waves as a noncontact-type electric power supply system; however, there are strict regulations from the perspective of avoiding adverse effects on the human body and malfunction of electronic devices, and thus it has been difficult to introduce into an inhabited place such as an office space.

In view of such points, the inventors of the present application and others have proposed an electric power supply system using electric field coupling technology which can contactlessly supply electric power by making use of series resonance or parallel resonance without electromagnetic induction or electromagnetic waves (see Patent Document 2).

Patent Document 1: Japanese Unexamined Patent Application, Publication No. H09-93704
Patent Document 2: Japanese Unexamined Patent Application, Publication No. 2009-89520
Non-Patent Document 1: "Nature Materials", Vol. 6, p.p. 413-417 (T. Sekitani et al., 2007)

DISCLOSURE OF THE INVENTION

Problems to be Solved by the Invention

However, the electric power supply systems described in Patent Document 2 in which the electric field coupling technology is used have a problem in that a wide gap interval cannot be formed, and it is impossible to get away from the problem of tribology between insulating layers and metal plates when the electric power supply system is used for a sliding body.

The present invention has been made in view of such circumstances, and has an object of performing stable electric power supply irrespective of a gap interval in an electric power supply system in which the electric field coupling technology is used.

Means for Solving the Problems

In order to solve the above problem and achieve the object, the electric power supply system can assume the following such configuration.

An electric power supply system according to one aspect of the present invention includes:
an electric power transmission electrode for transmitting electric power from an electric power source;
an electric power reception electrode that is disposed so as to contactlessly face the electric power transmission electrode to form a junction capacitance, and receives the electric power transmitted from the electric power transmission electrode through the junction capacitance; and
a plasma generation unit for generating a plasma in a space between the electric power transmission electrode and the electric power reception electrode in which the junction capacitance is formed.

The plasma generation unit may include a high-voltage high-frequency electric power source for generating the plasma.

The electric power supply system may further include a plasma maintaining unit for maintaining, in the space between the electric power transmission electrode and the electric power reception electrode, the plasma generated in the space between the electric power transmission electrode and the electric power reception electrode by the plasma generation unit.

The plasma maintaining unit may include a dielectric having a function of maintaining the plasma in the space between the electric power transmission electrode and the electric power reception electrode by preventing the plasma generated in the space by the plasma generation unit from being lost due to transfer of electrons from the electrode.

The plasma maintaining unit may maintain the plasma in the space by forming a magnetic field in a peripheral portion of the space between the electric power transmission electrode and the electric power reception electrode, and changing a travelling direction of positive ions and electrons constituting the plasma generated in the space by the plasma generation unit.

The plasma generation unit may further include a reheating unit for reheating, with microwaves or ultraviolet rays, the plasma generated by the plasma generation unit.

Effects of the Invention

According to the present invention, in an electric power supply system in which the electric field coupling technology is used, the electric power can be supplied in a non-contact manner while the junction capacitance is increased, and therefore, the electric power can be supplied in a stable manner irrespective of the gap interval.

PREFERRED MODE FOR CARRYING OUT THE INVENTION

Figure 1:
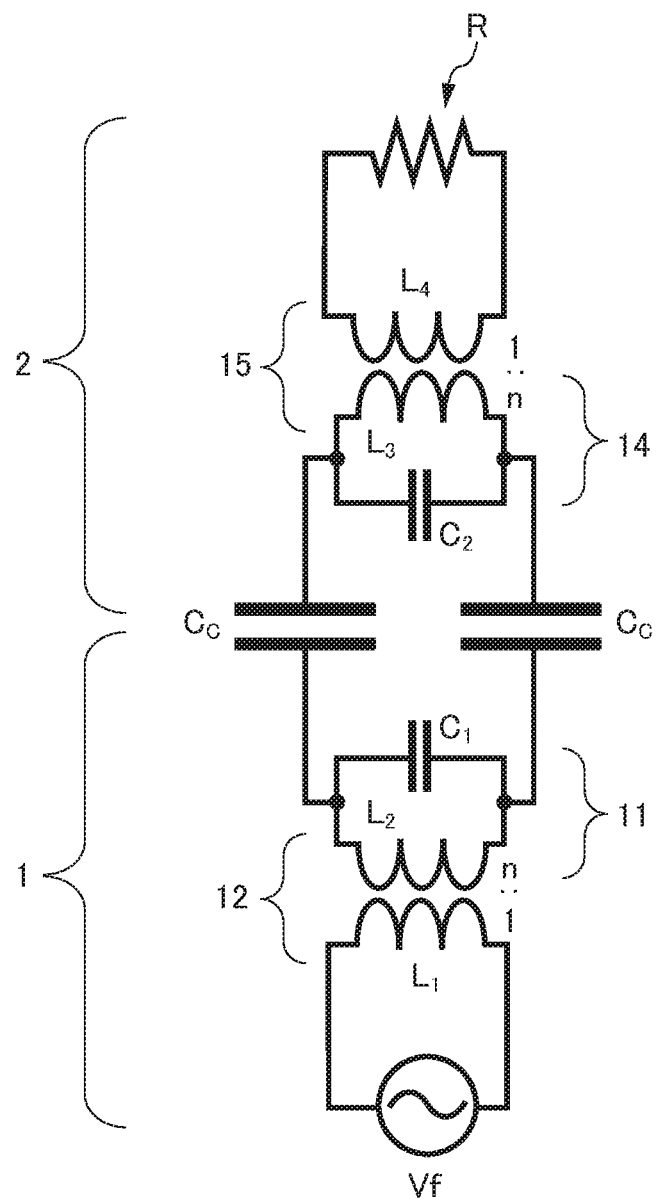
FIG. 1 is a diagram illustrating a basic circuit of an electric power transmission circuit to which electric field coupling electric power transmission technology serving as a basis of the present invention is applied.

Hereinafter, an embodiment of the present invention will be explained.

First, the basic concept common to the electric power supply systems to which the present invention is applied will be explained. The electric power supply system to which the present invention is applied is an electric power supply system for supplying electric power from a fixed body arranged in an electric power supplying area to a mobile body arranged in an electric power supplied area. The specific configurations of the electric power supplying area and electric power supplied area are arbitrary and, for example, include an internal space of a building such as an ordinary house and an office building, an internal space of a vehicle such as a train and an airplane, or an outdoor space. Hereinafter, a surface that separates the electric power supplying area and the electric power supplied area from each other will be referred to as a boundary surface. For example, in a case where the electric power supplied area is defined as a room of a building, and the electric power supplying area is defined as a floor portion of the room, the upper surface (floor surface) of the floor portion will be the boundary surface.

The fixed body includes those having an electric power source provided inside of the fixed body, and those supplying the electric power supplied from an external electric power source provided outside of the fixed body to the mobile body. This fixed body is arranged in the electric power supplying area; however, it is not limited to those that are fixed in a permanently immovable manner, and includes those that can be detached from the electric power supplying area when not in use and those that can be moved to any position within the electric power supplying area. In particular, the entirety of the fixed body may not be necessarily fixed at all times and, for example, includes those that, by adjusting the positions of a part of the constituent elements of the fixed body as necessary, can change a relative positional relationship between the constituent elements and the mobile body.

Mobile body includes those that are used by being arranged in a fixed manner in the electric power supplied area (stationary body), and those that move as necessary within the electric power supplied area (mobile body). The functions and the specific configuration of the mobile body are arbitrary except for the features specifically described; however, devices such as computers and consumer electronics can be exemplified as the stationary body, and robots and electric vehicles can be exemplified as the mobile body.

The electric power supply system configured in this way supplies electric power contactlessly from the fixed body to the mobile body by employing electric field coupling electric power transmission technology. The electric field coupling electric power transmission technology is a technology that realizes contactless electric power electrical transmission by passing a high-frequency electric current in a state providing two metal plates (conductive plates) to face each other and form a capacitor using these two metal plates as a pair of electrodes (such capacitor will be hereinafter referred to as a "junction capacitance"). The electric power electrical transmission system to which the electric field coupling electric power electrical transmission technology includes an electric power transmission unit for transmitting the electric power from the electric power source, and an electric power reception unit for receiving the electric power from the electric power transmission unit and supplying to the load. In this case, junction capacitance is formed by arranging an electrode such as a metal plate provided at the downstream end of the electric power transmission unit (hereinafter referred to as a "electric power transmission electrode") and an electrode such as a metal plate provided at the upstream end of the electric power reception unit (hereinafter referred to as a "electric power reception electrode") to face each other. According to the electric power electrical transmission system to which the electric field coupling electric power electrical transmission technology is applied, the electric power transmission electrode of the fixed body does not need to be exposed in the electric power supplied area; therefore, the safety and the durability of the electric power supply system can be enhanced. In addition, by providing a plurality of electric power transmission electrodes, the electric power can be continuously supplied to the mobile body even if the mobile body moves, and thus it is possible to ensure degrees of freedom in the movement of the mobile body.

In particular, a part of the features of the electric power supply system to which the present invention is applied is in the point of providing a parallel resonance circuit to the mobile body, and performing electric power supply from the fixed body under a condition generating parallel resonance in this parallel resonance circuit. According to this configuration, the impedance of the coupling capacitor can be made to be extremely smaller than the impedance of the parallel resonance circuit during parallel resonance, and it is possible to obtain an advantage of suppressing the influence on the electric power supply efficiency from the change in the capacitance of the coupling capacitor. It should be noted that the resonance circuit is not limited to the parallel resonance circuit, and may be a series resonance circuit.

FIG. 1 is a diagram illustrating a basic circuit of an electric power transmission circuit to which the electric field coupling electric power transmission technology serving as a basis of the present invention is applied.

As shown in FIG. 1, the electric power transmission circuit to which the electric field coupling electric power transmission technology is applied includes an electric power transmission unit 1 and an electric power reception unit 2.

As described above, the electric field coupling electric power transmission technology is a technology that realizes a contactless electric power electrical transmission by passing a high-frequency electric current in a state forming a junction capacitance Cc using the pair of electrodes including two metal plates facing each other. More specifically, the electric field coupling electric power electrical transmission technology is realized by attaching the electric power transmission electrode of the metal plate to the end of the electric power transmission unit 1 for transmitting the electric power from an electric power source Vf, attaching the electric power reception electrode of the metal plate to the end of the electric power reception unit 2 receiving the electric power and supplying the electric power to a load R, and arranging the electric power transmission electrode and the electric power reception electrode forming the pair of electrodes to face each other to form the junction capacitance Cc.

The electric power transmission unit 1 includes a parallel resonance circuit 11 and a transformer 12, and is connected to an alternating current electric power source Vf to receive the supply of the electric power. The parallel resonance circuit 11 is connected via the transformer 12 to the alternating current electric power source Vf, and includes a capacitor C1 and a coil L2. More specifically, the capacitor C1 and the coil L2 are connected in parallel to each other, whereby the parallel resonance circuit 11 is formed. Furthermore, the coil L2 is employed as the secondary side winding, and the coil L1 is employed as the primary side winding, whereby the transformer 12 is formed. In this case, since it is set as the number of windings of the coil L1: the number of windings of coil L2=1:n, the voltage at the primary side, i.e. the voltage of the alternate current electric power source Vf, is stepped up n times by the transformer 12, and then is applied to the parallel resonance circuit 11. Two electric power transmission electrodes are connected to both ends of the parallel resonance circuit.

The electric power reception unit 2 includes a parallel resonance circuit 14 and a transformer 15. The parallel resonance circuit 14 is connected to two electric power reception electrodes of the electric power reception unit 2, and includes a capacitor C2 and a coil L3. More specifically, the capacitor C2 and the coil L3 are connected in parallel to each other, whereby the parallel resonance circuit 14 is formed. Furthermore, the coil L3 is employed as the primary side winding, and the coil L4 is employed as the secondary side winding, whereby the transformer 15 is formed. In this case, since it is set as the number of windings of the coil L3: the number of windings of the coil L4=n:1, the voltage at the primary side, i.e. the voltage received by the electric power reception electrode and applied to the parallel resonance circuit 14, is stepped down 1/n times by the transformer 15, and then is applied to the load R.

Figure 2:
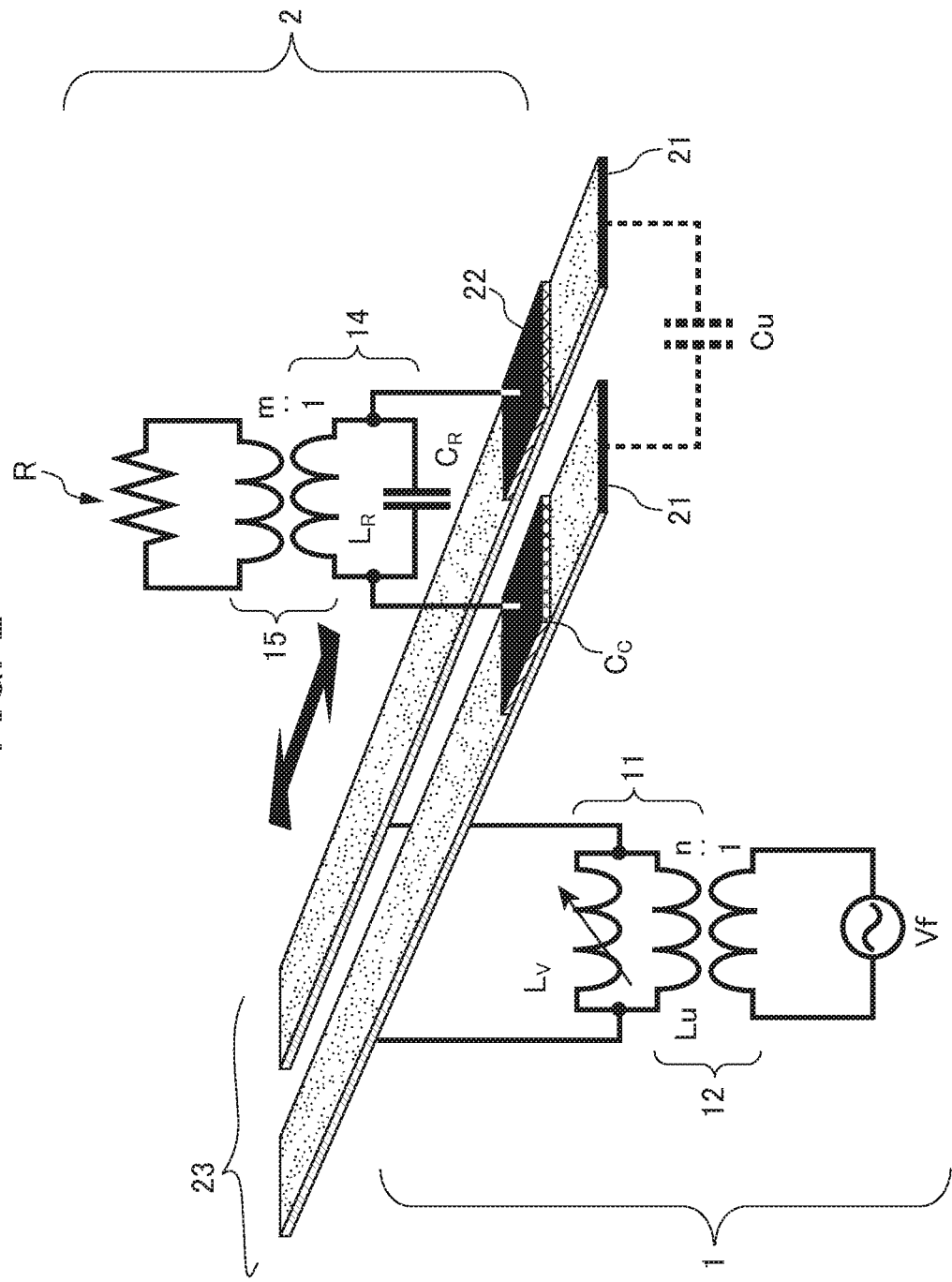
FIG. 2 is a schematic diagram illustrating one embodiment of an electric power supply track to which the electric field coupling electric power transmission technology serving as the basis of the present invention is applied, and in which the electric power transmission circuit of FIG. 1 is applied.

FIG. 2 is a schematic diagram illustrating one embodiment of an electric power supply track to which the electric field coupling electric power transmission technology serving as the basis of the present invention is applied and in which the electric power transmission circuit of FIG. 1 is applied.

As shown in FIG. 2, the electric power transmission unit 1 causes each of the two tracks extending in a rod shape in a predetermined direction to function as the electric power transmission electrode 21. It should be noted that these electric power transmission electrodes 21 that are the two tracks will be collectively referred to as a "contactless electric power transmission track 23". More specifically, the electric power reception unit 2, i.e., the mobile body, has each of the two electric power reception electrodes 22 arranged so as to be opposed to the contactless electric power transmission electric track 23, so that the electric power reception unit 2 is configured to be freely movable along the contactless electric power transmission track 23. Two junction capacitances Cc (junction capacitances Cc at the left-hand side and the right-hand side of FIG. 1) are respectively formed by the two electric power reception electrodes 22 and the two electric power transmission electrodes 21 constituting the contactless electric power transmission track 23. More specifically, the electric power reception unit 2 can freely move on the contactless electric power transmission track 23, and can receive the electric power from any position on the contactless electric power transmission track 23.

However, as shown in FIG. 2, in the case of the electric power transmission electrodes 21 being configured as tracks in a long rod shape, a line capacitance Cu cannot be disregarded. Therefore, a resonance occurs between the line capacitance Cu and the electric power transmission-side inductor Lu (corresponding to the coil L2 of FIG. 1). Therefore, the transmission efficiency of the electric power can be improved. It should be noted that, in addition to the electric power transmission-side inductor Lu, an electric power transmission-side inductor Lv for adjustment may be inserted as shown in FIG. 2 (in this case, a parallel circuit of the electric power transmission-side inductor Lu and the electric power transmission-side inductor Lv for adjustment corresponds to the coil L2 in FIG. 1). Furthermore, in the example of FIG. 2, although the electric power transmission-side inductor Lv for adjustment is connected in parallel, the electric power transmission-side inductor Lv for adjustment may be connected in series.

Figure 3A:
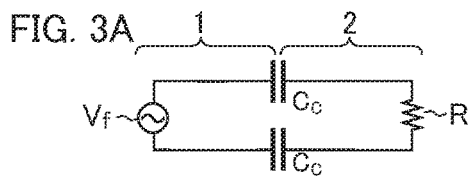
FIGS. 3A to 3T are figures illustrating various kinds of configuration examples of circuits of electric power supply systems to which the present invention is applied, i.e., electric power supply systems capable of contactlessly supplying the electric power with the electric field coupling.
Figure 3B:
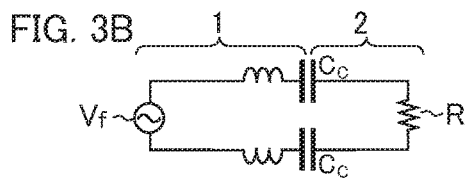
Figure 3C:
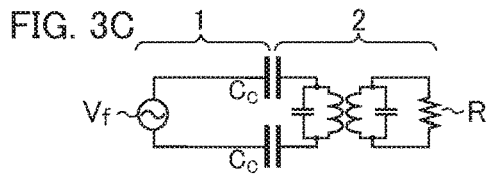
Figure 3D:
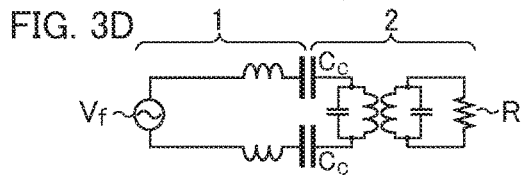
Figure 3E:
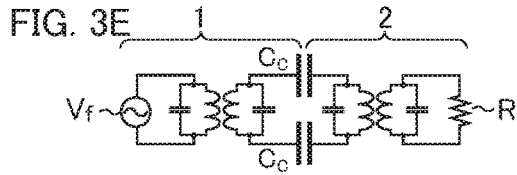
Figure 3F:
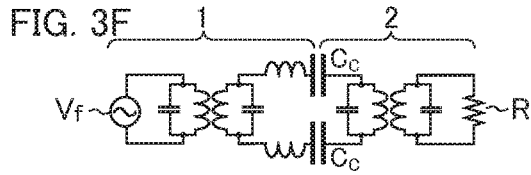
Figure 3G:
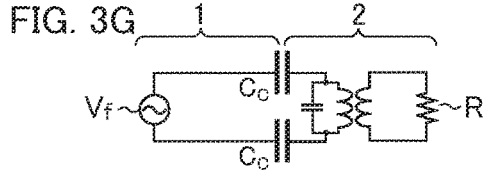
Figure 3H:
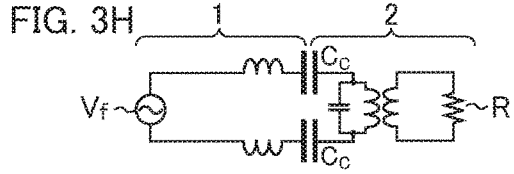
Figure 3I:
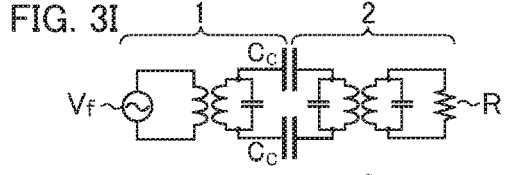
Figure 3J:
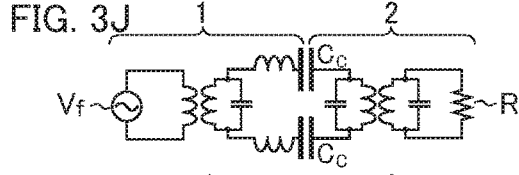
Figure 3K:
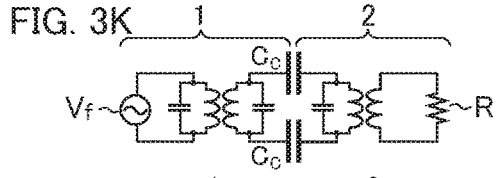
Figure 3L:
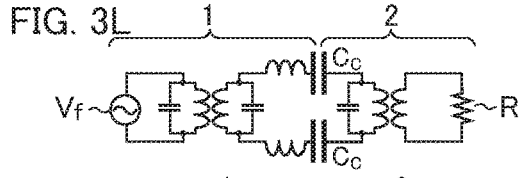
Figure 3M:
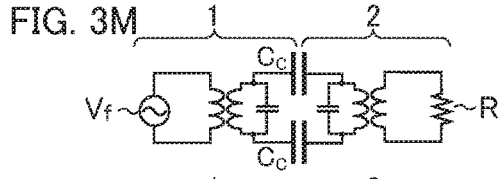
Figure 3N:
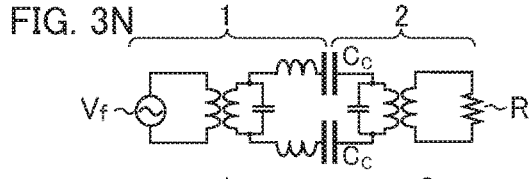
Figure 3O:
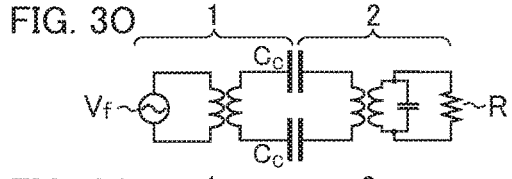
Figure 3P:
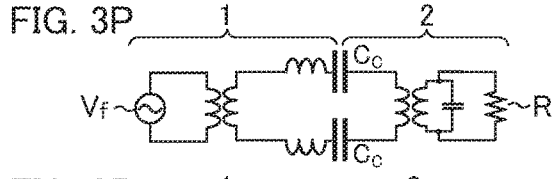
Figure 3Q:
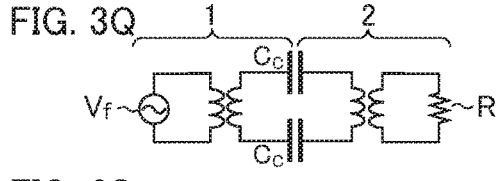
Figure 3R:
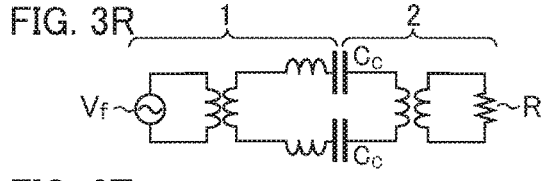
Figure 3S:
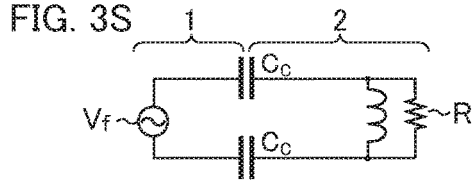
Figure 3T:
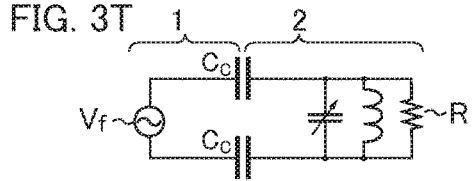

FIGS. 3A to 3T are diagrams illustrating various configuration examples of circuits of electric power supply systems to which the present invention is applied, i.e. electric power supply systems capable of contactlessly supplying electric power with electric field coupling. More specifically, in the case of realizing an electric power supply system to which the present invention is applied, any circuit configuration among those shown in FIGS. 3A to 3T may be adopted. In other words, in order to contactlessly supply the electric power with the electric field coupling, a circuit shown in any one of FIGS. 3A to 3T can be employed.

For example, the electric power transmission circuit to which the electric field coupling electric power electrical transmission technology shown in FIG. 3A is applied forms the junction capacitance Cc by causing the electric power transmission electrode and the electric power reception electrode to face each other, whereby the electric power transmission unit 1 transmits the electric power from the electric power source Vf to the electric power reception unit 2, and the electric power reception unit 2 receives the electric power and supplies to the load R. It should be noted that the circuits shown in FIGS. 3A to 3T are merely examples, and so long as the electric power can be contactlessly supplied with electric field coupling, a circuit of any configuration may be employed.

Herein, when the electric power is supplied contactlessly with the electric field coupling, the fields of application are limited by the magnitude of the junction capacitance Cc. However, when a plasma P can be generated in a space between the electric power transmission electrode 21 and the electric power reception electrode 22 in which the junction capacitance Cc is formed, the junction capacitance Cc becomes extremely large, and thus the fields of application are drastically expanded.

Therefore, the electric power supply system according to the present embodiment performs contactless electric power supply while increasing the junction capacitance Cc by including a plasma generation unit 41 for generating the plasma P in the space between the electric power transmission electrode 21 and the electric power reception electrode 22 in which the junction capacitance Cc is formed. Hereinafter, a method for generating the plasma P in the space between the electric power transmission electrode 21 and the electric power reception electrode 22 in which the junction capacitance Cc is formed will be explained.

First, it is assumed that an atmospheric pressure plasma is used as a plasma source employed in the present embodiment. Since equipment such as a vacuum chamber thereby becomes unnecessary, the plasma P can be generated in the space between the electric power transmission electrode 21 and the electric power reception electrode 22 in which the junction capacitance Cc is formed without using any special shielding. It should be noted that, upon generating the plasma P in the space, there may be a case where conductive property is imparted or a case where dielectric property is imparted to this space. In the present embodiment, the case is adopted in which a dielectric property is imparted.

Figure 4A:
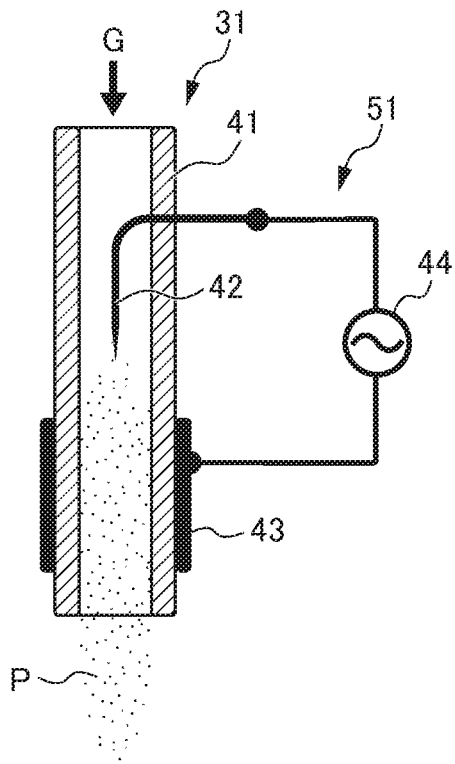
FIGS. 4A to 4C are figures each schematically illustrating, for example, an overview of a cross sectional configuration of a plasma emission source including a plasma generation unit and a plasma generation unit and an overview of the circuit of the plasma generation source.
Figure 4C:
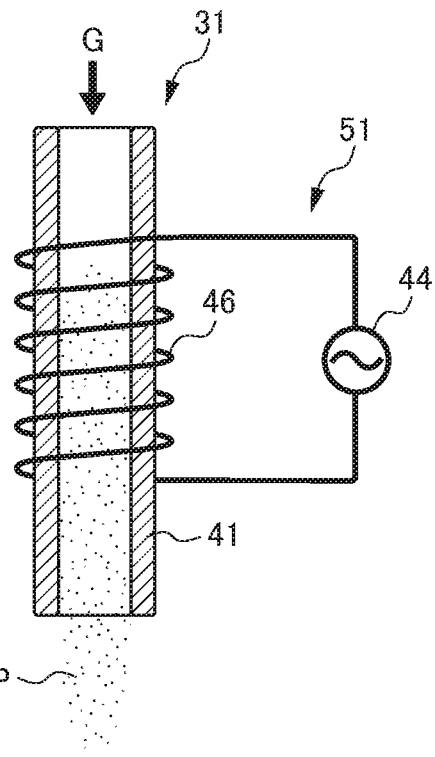
Figure 4B:
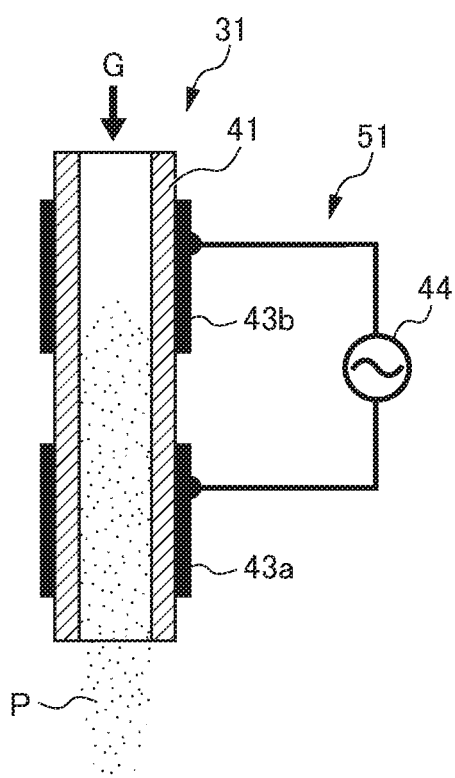
Figure 5:
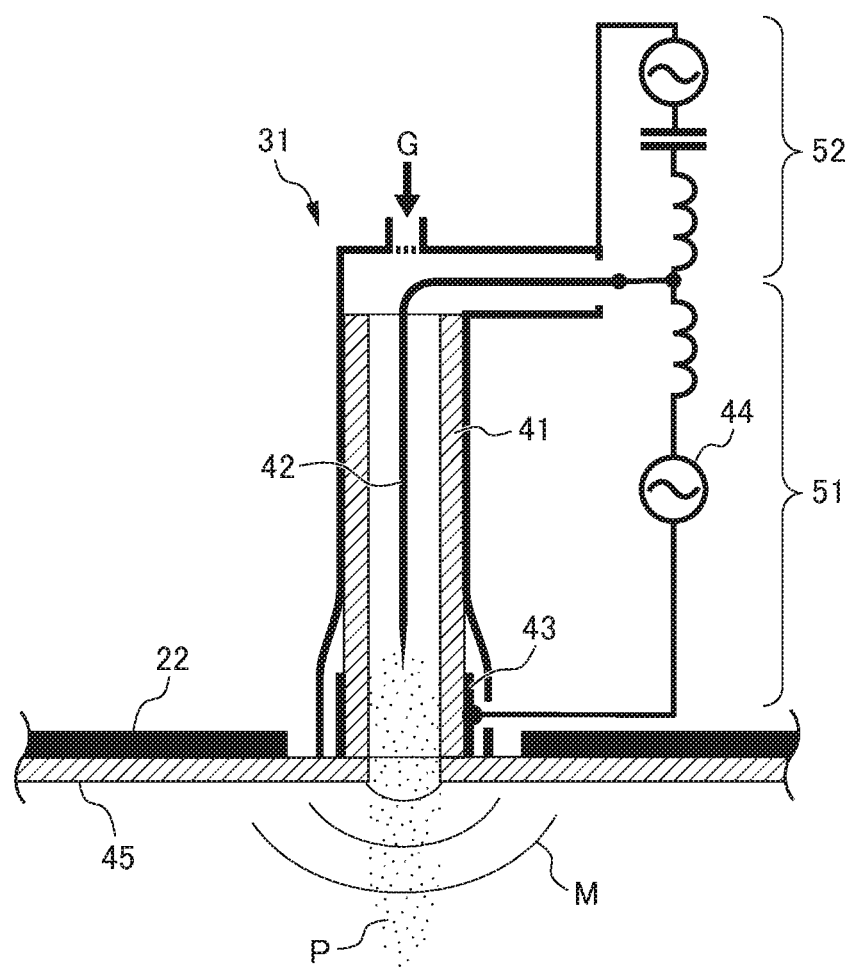
FIG. 5 is a figure schematically illustrating, for example, an overview of a cross sectional configuration and a circuit of a plasma emission source having a reheating unit.

Since the dielectric property is imparted to the space between the electric power transmission electrode 21 and the electric power reception electrode 22 in which the junction capacitance Cc is formed, the structure of the electric power transmission electrode 21 and the electric power reception electrode 22 is such that the opposing electrodes (metal plates) are coated with an insulating layer 45 (see FIG. 5). It is thereby possible to prevent the plasma P from flowing through the electrode and being lost. More specifically, when the electrons constituting the plasma P flow through the material (metal) of the electric power transmission electrode 21 or the electric power reception electrode 22, the positive ions constituting the plasma P receive electrons from the electrode to be neutralized, and as a result, the plasma is lost. However, since it is possible to prevent the movement of electrons if providing the insulating layer 45 on the electrode plate, the loss of the plasma P generated in the space between the electric power transmission electrode 21 and the electric power reception electrode 22 can be prevented. It should be noted that it may be configured so that the plasma generation unit 41 assumes a configuration including a plasma generation source 51 which generates the plasma P. The configuration thereof will be explained with reference to FIGS. 4A to 4C.

FIGS. 4A to 4C are figures schematically illustrating by example an overview of a cross-sectional configuration of the plasma emission source 31 constituted by the plasma generation source 51 and the plasma generation unit 41, and an overview of the circuit of the plasma generation source 51.

The plasma emission source 31 as shown in FIG. 4A is configured to include the plasma generation unit 41 and the plasma generation source 51. The plasma generation unit 41 is constituted by a conduit having heat resistance and insulating properties such as a quartz glass tube. It is thereby possible to prevent the plasma P from flowing through the electrode and being lost. The plasma generation source 51 is configured to include a metallic needle electrode 42, a cylindrical electrode 43, and a high-voltage high-frequency electric power source 44.

When a voltage is applied by the high-voltage high-frequency electric power source 44 in a state in which the needle electrode 42 is inserted in the inside of the plasma generation unit 41, the plasma P is generated inside of the plasma generation unit 41. At this occasion, when a gas G is introduced from the end of the plasma generation unit 41, the plasma P is emitted from the other end of the plasma generation unit 41. It is thereby possible, when the plasma generation unit 41 is connected to the space between the electric power transmission electrode 21 and the electric power reception electrode 22, to generate the plasma P in the space.

It should be noted that, as the gas G introduced from the end of the plasma generation unit 41, it is possible to adopt a gas of an alkaline earth metal such as Ar, Ne, He, Xe, and Kr; a molecular gas such as nitrogen, carbon dioxide, air and oxygen; a halogen gas; or the like. It should be noted that, in the case of using with the electric field coupling, air is preferable in the point in that the system can be simplified.

Similarly to the example of FIG. 4A, the plasma emission source 31 shown in FIG. 4B is configured to include a plasma generation unit 41 and a plasma generation source 51; however, the needle electrode 42 is not used in the plasma generation source 51. More specifically, the example of FIG. 4B assumes a configuration in which, the cylindrical electrodes 43a and 43b are provided on side surfaces of the plasma generation unit 41. In this state, when a voltage is applied from the high-voltage high-frequency electric power source 44, the plasma P is generated inside of the plasma generation unit 41. At this occasion, when the gas G is introduced from the end of the plasma generation unit 41, the plasma P is emitted from the other end of the plasma generation unit 41.

Similarly to the other examples shown in FIG. 4A and FIG. 4B, the plasma emission source 31 shown in FIG. 4C is configured to include a plasma generation unit 41 and a plasma generation source 51; however, it differs from the other examples shown in FIG. 4A and FIG. 4B in the point in that a heating coil 45 is used in the plasma generation source 51. When a voltage is applied from the high-voltage high-frequency electric power source 44 in a state in which the heating coil 45 is wound around the plasma generation unit 41, the plasma P is generated inside of the plasma generation unit 41. At this time, when the gas G is introduced from the end of the plasma generation unit 41, the plasma P is emitted from the other end of the plasma generation unit 41.

It should be noted that it may the plasma emission source 31 may be configured to assume a configuration further including a reheating unit 52 for reheating, with microwaves M or ultraviolet rays, the plasma P emitted from the plasma generation unit 41. The configuration thereof will be explained with reference to FIG. 5.

FIG. 5 is a figure schematically illustrating by example an overview of a cross-sectional configuration and a circuit of a plasma emission source 31 having the reheating unit 52. The plasma emission source 31 shown in FIG. 5 assumes a configuration further providing the reheating unit 52 to the configuration shown in FIG. 4A.

First, when a voltage is applied from the high-voltage high-frequency electric power source 44 in a state in which the metallic needle electrode 42 is inserted in the plasma generation unit 41, the plasma P is generated inside of the plasma generation unit 41. At this occasion, when the gas G is introduced from the end of the plasma generation unit 41, the plasma P is emitted from the other end of the plasma generation unit 41.

At this occasion, when the microwaves M are radiated in a superimposed manner by the reheating unit 52, the plasma P is reheated. As a result, the performance as the plasma P can be improved. The plasma P reheated by the microwaves M is generated in the space between the electric power transmission electrode 21 and the electric power reception electrode 22. It should be noted that ultraviolet rays may be radiated instead of the microwaves M, or simultaneously.

In addition, since the electric power transmission electrode 21 and the electric power reception electrode 22 are coated with the insulating layer 45 as described above, it is possible to prevent the plasma P from flowing away through the electric power transmission electrode 21 or the electric power reception electrode 22 and being lost. It should be noted that, in FIG. 5, the system of FIG. 4A is applied to the reheating unit 52, but the other systems shown in FIGS. 4B and 4C can also be applied to the reheating unit 52.

Figure 6A:
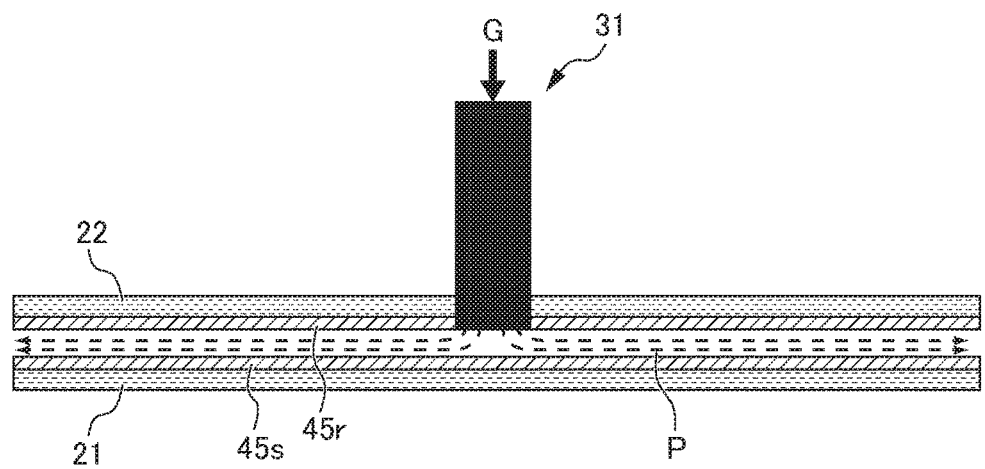
FIGS. 6A and 6B are figures schematically illustrating, for example, an overview of cross sectional configurations of electrode structures when the plasma emission source is connected to the electric power reception electrode.
Figure 6B:
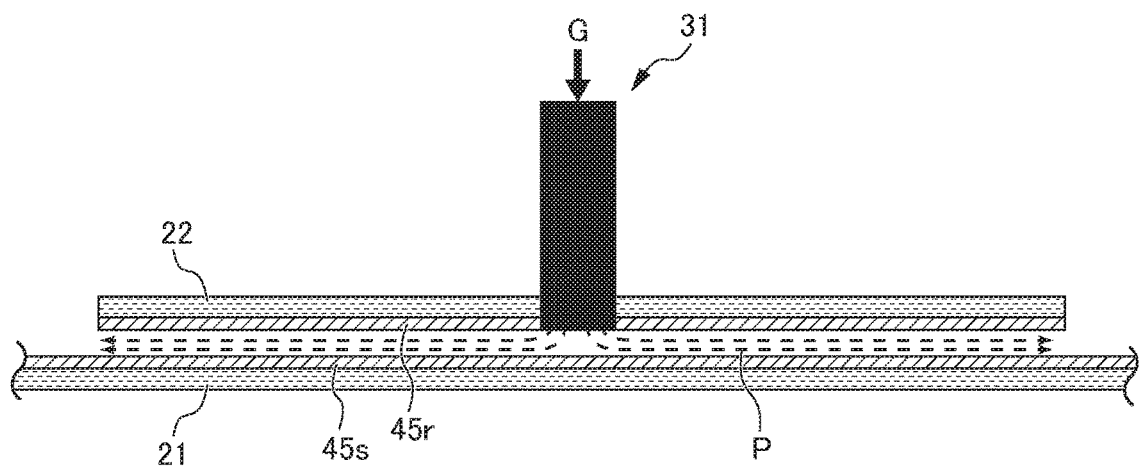

FIGS. 6A and 6B are figures schematically illustrating by example overviews of cross-sectional configurations of electrode structures when the plasma emission source 31 is connected to the electric power reception electrode 22. In the example of the electrode structure shown in FIG. 6A, the electric power transmission electrode 21 made of a metal plate coated with an insulating layer 45s and the electric power reception electrode 22 made of a metal plate coated with an insulating layer 45r are disposed in parallel, and the plasma emission source 31 is arranged to penetrate through the electric power reception electrode 22 including the insulating layer 45. The plasma P is thereby generated by the plasma generation unit 41 of the plasma emission source 31 in the space between the electric power transmission electrode 21 and the electric power reception electrode 22.

It should be noted that the shapes of the electric power transmission electrode 21 and the electric power reception electrode 22 are not particularly limited, and that it is possible to employ electrodes of any shape such as a circle and a rectangle. In addition, it may be configured so that the plasma emission source 31 is disposed so as to penetrate through both the electric power transmission electrode 21 and the electric power reception electrode 22, or it may be configured to be disposed to penetrate through only either one thereof. Furthermore, the plasma emission source 31 may be arranged so that the plasma P is generated in the space between the electric power transmission electrode 21 and the electric power reception electrode 22 from around the electric power transmission electrode 21 and the electric power reception electrode 22, without penetrating through either of the electric power transmission electrode 21 and the electric power reception electrode 22.

In addition, in the example of the electrode structure as shown in FIG. 6B, the electric power transmission electrode 21 is created to be larger compared to FIG. 6A, whereby the electric power reception electrode 22 becomes movable. As a result, even in a state having moved the electric power reception electrode 22 disposed so that the plasma emission source 31 penetrates therethrough, the plasma generation unit 41 of the plasma emission source 31 can generate the plasma P in the space between the electric power transmission electrode 21 and the electric power reception electrode 22.

Figure 7A:
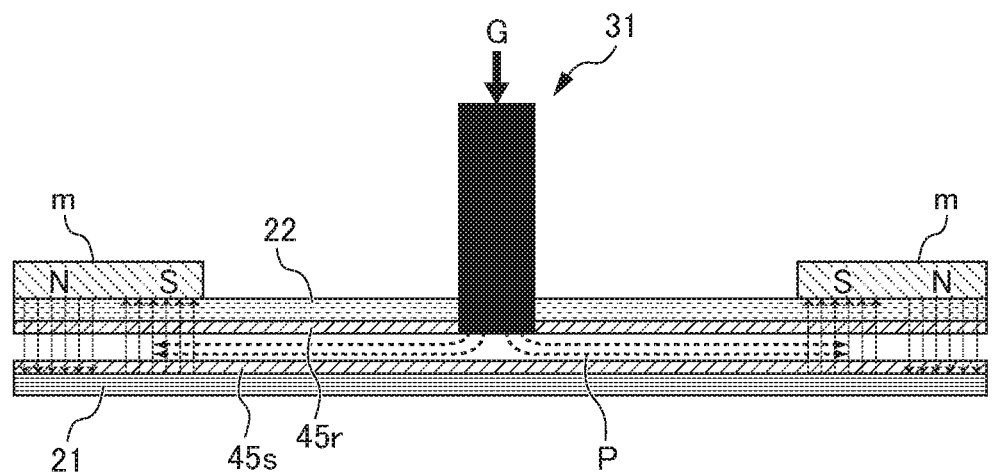
FIGS. 7A and 7B are figures schematically illustrating, for example, an overview of a cross sectional configuration and a circuit of an electrode structure in a case where plasma is configured to be maintained in a space between an electric power transmission electrode and an electric power reception electrode with a magnetic field when the plasma emission source is connected to the electric power reception electrode.
Figure 7B:
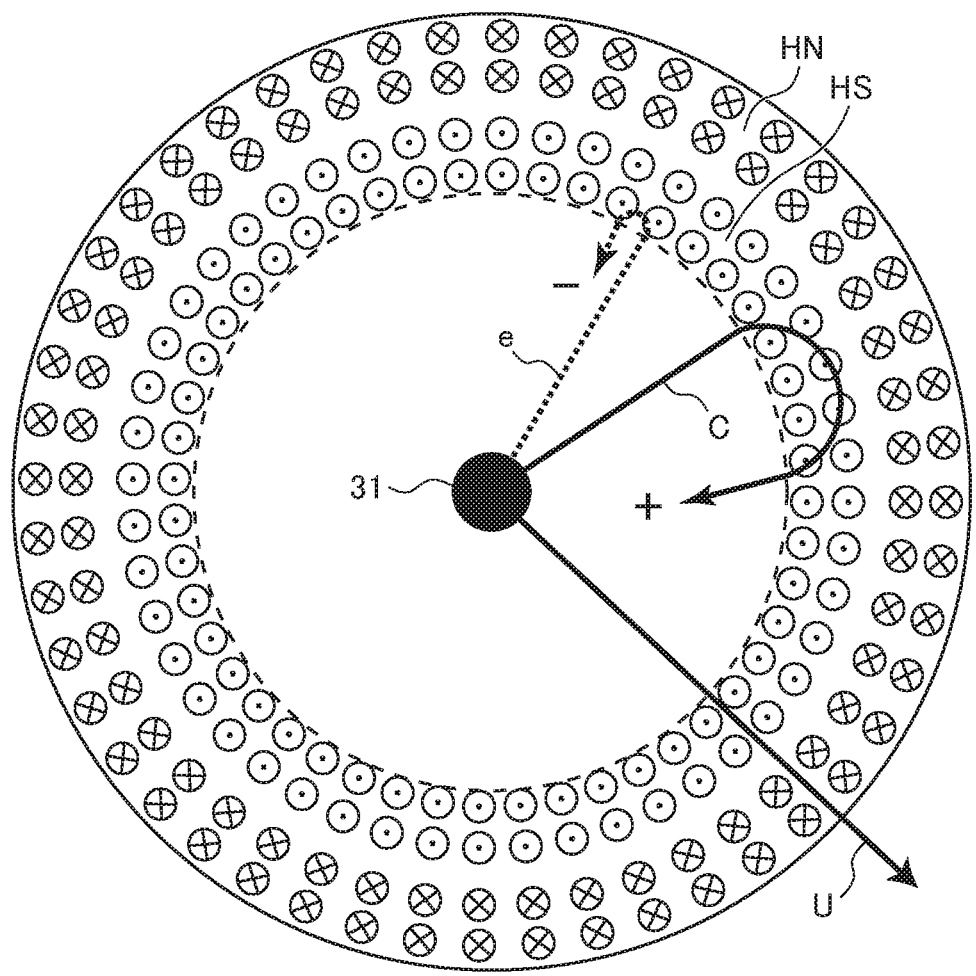

FIGS. 7A and 7B are figures schematically illustrating by example an overview of a cross-sectional configuration and a circuit of an electrode structure in a case of adopting a configuration in which the plasma P is maintained in the space between the electric power transmission electrode 21 and the electric power reception electrode 22 by a magnetic field, when the plasma emission source 31 is connected to the electric power reception electrode 22. In the electrode structure illustrated in FIG. 7A, the electric power transmission electrode 21 made of a metal plate coated with the insulating layer 45s and the electric power reception electrode 22 made of a metal plate coated with the insulating layer 45r are arranged in parallel, and the plasma emission source 31 is arranged so as to penetrate through the electric power reception electrode 22 including the insulating layer 45. What has been described above is the same configuration as the electrode structure exemplified in FIGS. 6A and 6B; however, permanent magnets m are additionally provided to the electric power reception electrode 22 in the example of FIG. 7A.

More specifically, in the electrode structure exemplified in FIGS. 6A and 6B, even if the plasma P is generated in the space between the electric power transmission electrode 21 and the electric power reception electrode 22, the plasma P will escape to outside from the end of the space between the electric power transmission electrode 21 and the electric power reception electrode 22. In order to prevent this, a plasma maintaining unit for maintaining the plasma P is provided in the present embodiment. The plasma maintaining unit includes the electric power transmission electrode 21 made of a metal plate coated with the insulating layer 45s, the electric power reception electrode 22 made of a metal plate coated with the insulating layer 45r, and permanent magnets m.

The insulating layers 45s and 45r prevent the plasma P from flowing through the electric power transmission electrode 21 or the electric power reception electrode 22 and being lost. In addition, the permanent magnets m are disposed at the end of the electric power reception electrode 22 and the electric power transmission electrode 21 and the electric power reception electrode 22, and the plasma P is maintained by the magnetic field formed by the permanent magnet m. More specifically, for example, as exemplified in FIG. 7A, a ferromagnetic metal (for example, iron, Ni) is adopted as the electrode material at the side of the electric power transmission electrode 21, and a non-magnetic metal (for example, aluminum) is adopted as the electrode material at the side of the electric power reception electrode 22. In addition, the permanent magnet m is provided on the metal electrode on the side of the electric power reception electrode 22. As a result, a concentric magnetic field is formed in the space between the electric power transmission electrode 21 and the electric power reception electrode 22.

FIG. 7B is a top view of the electrode structure of FIG. 7A. In the electrode structure exemplified in FIGS. 7A and 7B, as shown in FIG. 7A, the magnetic field flows from the permanent magnet m placed on the non-magnetic electrode plate (the electric power reception electrode 22) via the ferroelectric electrode plate (electric power transmission electrode 21), and the magnetic field returns back to the permanent magnet m placed on the non-magnetic electrode plate (electric power reception electrode 22). As shown in FIG. 7B, the plasma P generated in the space between the plasma transmission electrode 21 and the electric power reception electrode 22 by the plasma generation unit 41 of the plasma emission source 31 thereby reaches a magnetic field HS. At this occasion, since the travelling direction of the electrons e constituting the plasma P is changed to the central direction (the direction in which the plasma emission source 31 is arranged) by the magnetic field HS, the electrons e do not leave to outside from the magnetic field HS.

Similarly, since the travelling direction of the positive ions c that constitute the plasma P is changed by the magnetic field HS to the central direction (the direction in which the plasma emission source 31 is arranged), the positive ions c do not leave to outside from the magnetic field HS. It should be noted that the uncharged particles U neutralized by recombination leave to outside of the magnetic fields HS and HN without being affected by the magnetic fields HS and HN. In this way, the plasma P is prevented from escaping to outside from the end of the space between the electric power transmission electrode 21 and the electric power reception electrode 22, and the charge density between the parallel electrodes is maintained.

It should be noted that the permanent magnets m disposed on the metal electrode of the electric power reception electrode 22 are preferably magnets having strong magnetic force such as a neodymium magnet. This is because, since the powerful permanent magnet m is disposed on the metal electrode of the electric power reception electrode 22, a powerful direct current magnetic field is formed in the space between the electric power transmission electrode 21 and the electric power reception electrode 22; therefore, the travelling directions of the electrons e and the positive ions c constituting the plasma P can be changed more strongly to the central direction (the direction in which the plasma emission source 31 is arranged).

In addition, in the electrode structure exemplified in FIGS. 7A and 7B, the shapes of the electric power transmission electrode 21 and the electric power reception electrode 22 adopt circular shapes; however, this shape is merely an example and it is not limited thereto. Any shape such as a rectangle can be adopted.

Figure 8A:
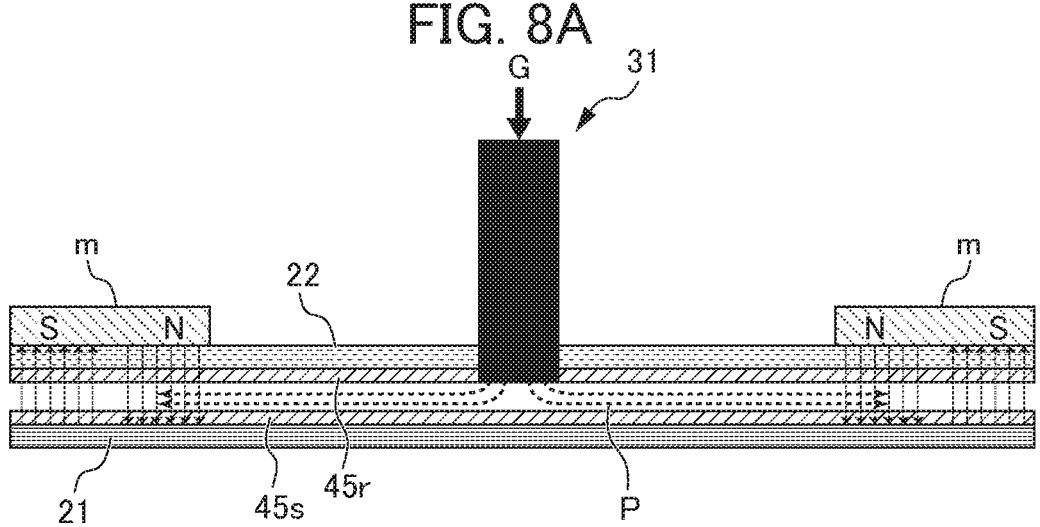
FIGS. 8A and 8B are figures illustrating a modified example of the specific example of the electrode structure as shown in FIGS. 7A and 7B, for example.
Figure 8B:
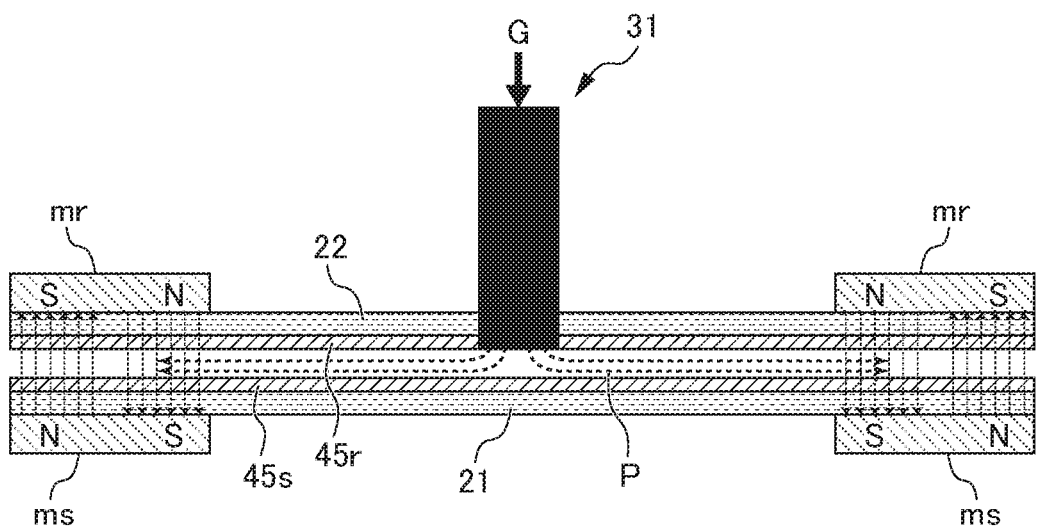

FIGS. 8A and 8B are figures illustrating modified examples of the specific example of the electrode structure exemplified in FIGS. 7A and 7B. FIG. 8A shows the same electrode structure as that of FIG. 7A for use in the comparison with FIG. 8B. FIG. 8B shows a modified example of the electrode structure with respect to FIG. 8A. More specifically, in the example of the electrode structure shown in FIG. 8A, a ferromagnetic metal is adopted as the electrode material of the electric power transmission electrode 21, and a non-magnetic metal is adopted as the electrode material of the electric power reception electrode 22; however, as shown in 8B, a non-magnetic metal may be adopted as the electrode material of both the electric power transmission electrode 21 and the electric power reception electrode 22. However, in this case, it is necessary to arrange a permanent magnet ms on the electric power transmission electrode 21 and arrange a permanent magnet mr on the electric power reception electrode 22. Since a magnetic field can thereby be concentrically formed in the space between the electric power transmission electrode 21 and the electric power reception electrode 22, the plasma P is prevented from escaping to outside from the end of the space between the electric power transmission electrode 21 and the electric power reception electrode 22, and the charge density between the parallel electrodes is maintained.

Figure 9A:
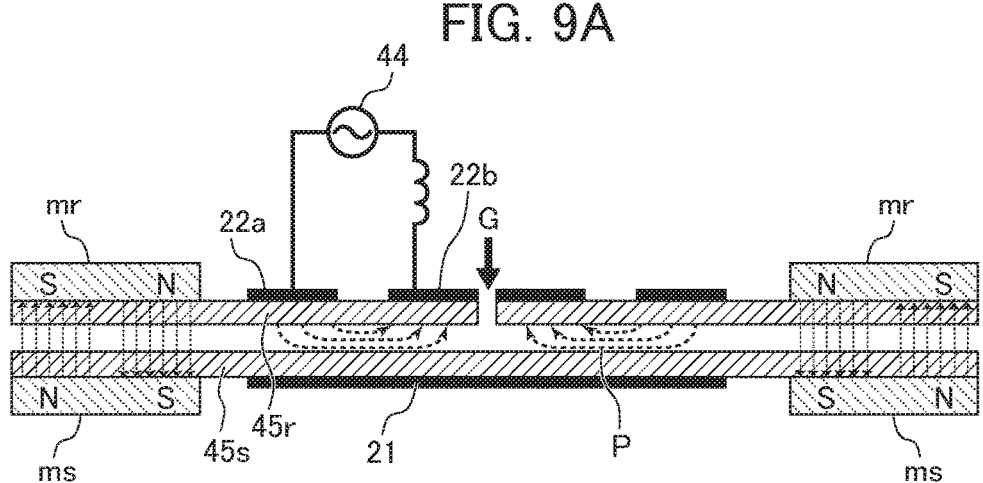
FIGS. 9A to 9C are figures schematically illustrating, for example, an overview of a cross sectional configuration and a circuit of an electrode structure different from the electrode structure shown in FIGS. 6A to 8B, for example.
Figure 9B:
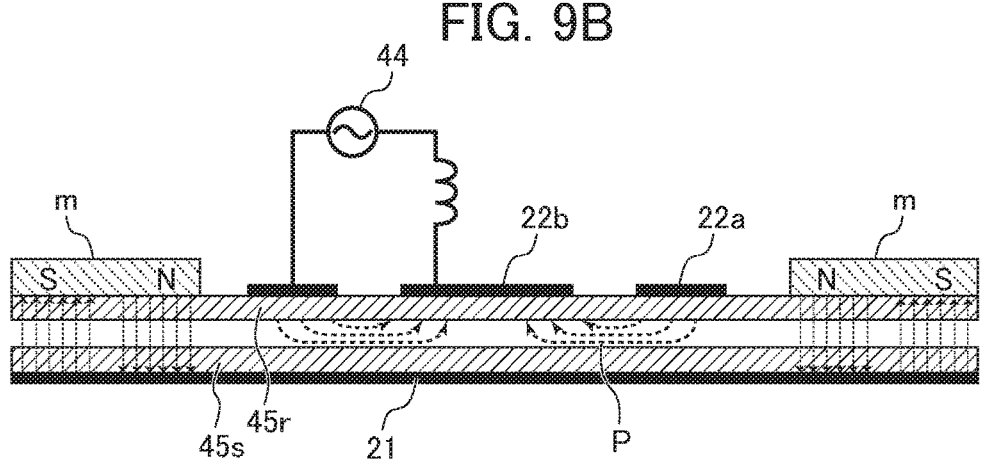
Figure 9C:
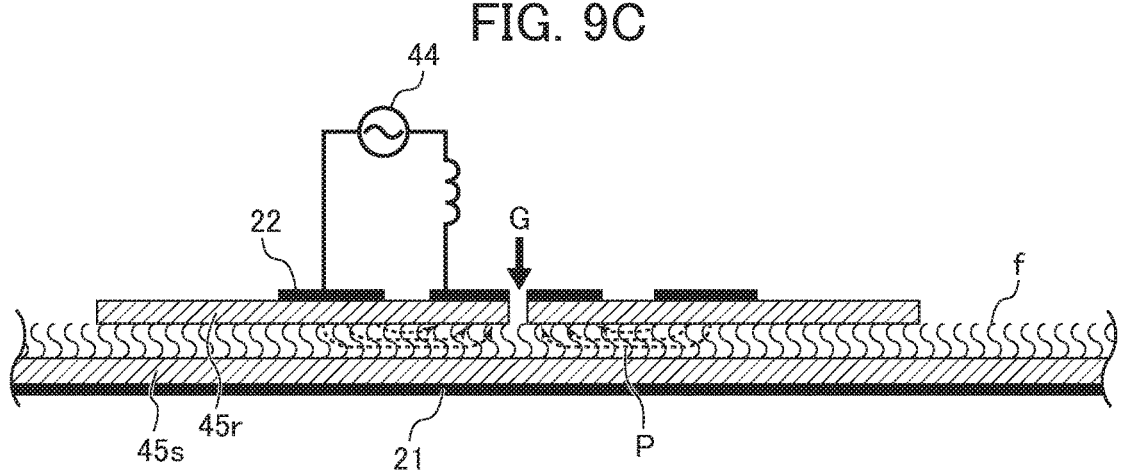

FIGS. 9A to 9C are figures each schematically illustrating by example an overview of a cross-sectional configuration and a circuit of an electrode structure different from the electrode structures exemplified in FIGS. 6 to 8. More specifically, contrary to the electrode structures exemplified in FIGS. 6A to 8B, FIGS. 9A to 9C exemplifies an electrode structure in the case where a high-voltage high-frequency electric power source 44 for generating the plasma P is disposed in the electric power reception electrode 22 itself.

In the example of the electrode structure of FIG. 9A, the electric power transmission electrode 21, and two concentric electric power reception electrodes 22a and 22b having a high-voltage high-frequency electric power source 44 for generating plasma P are arranged in parallel. In addition, the insulating layer 45s and the insulating layer 45r are arranged between the electric power transmission electrode 21 and the electric power reception electrodes 22a and 22b, and an introduction port of the gas G is provided in a central portion of the electric power reception electrode 22b. It should be noted that the electric power transmission electrode 21 is coated with the insulating layer 45s and the electric power reception electrodes 22a and 22b are coated with the insulating layer 45r. The permanent magnets ms and mr are disposed on the insulating layer 45s and 45r, respectively, and the gas G is introduced through the opening made in the insulating layer 45r at the same position as the introduction port.

When a voltage of high-voltage and high-frequency is applied to the two concentric electric power reception electrodes 22a and 22b, the plasma P is generated in the space between the electric power transmission electrode 21 and the electric power reception electrode 22. In addition, since the permanent magnets ms and mr are provided at the peripheries of the insulating layers 45s and 45r, respectively, the ion density of the central portion of the electric power reception electrode 22b is maintained at a high level because of the presence of the magnetic fields HS and HN similarly to the example of FIGS. 7A and 7B, and the plasma P is maintained in the space. It should be noted that the electric power transmission electrode 21 is made of a metallic electrode material. Therefore, the electric power is transmitted to the electric power reception electrode 22a or 22b by electric field coupling.

In the example of the electrode structure in FIG. 9B, an electric power transmission electrode 21 made of a ferromagnetic metal plate, and two concentric electric power reception electrodes 22a and 22b having a high-voltage high-frequency electric power source 44 for generating plasma P are arranged in parallel. An insulating layer 45s and an insulating layer 45r are arranged between the electric power transmission electrode 21, and the electric power reception electrodes 22a and 22b, forming a junction capacitance Cc. A permanent magnet m is provided on the insulating layer 45r; however, contrary to FIG. 9A, an intake port for the gas G is not provided in the central portion of the electric power reception electrode 22b. For this reason, a method for making the gas G existing in the space between the electric power transmission electrode 21 and the electric power reception electrode 22 into plasma is employed.

In this case, the same gas G is made into plasma by applying a voltage thereto without introducing the gas G; therefore, the temperature of the gas G rises. For this reason, a heat resistant material is required to be used for the insulating layers 45s and 45r. In addition, in the example of FIG. 9B, a ferromagnetic metal is used as the electrode material of the electric power transmission electrode 21; therefore, although the permanent magnet m is provided only at the side of the electric power reception electrode 22, a method may be adopted of arranging the permanent magnets ms and mr for the electric power transmission electrode 21 and the electric power reception electrode 22, respectively, without using a ferromagnetic metal at the side of the electric power transmission electrode 21.

It should be noted that, in the examples of the electrode structure in FIGS. 9A and 9B, the permanent magnet m is attached; however, this is merely an example. Alternatively, an electrode structure in which the permanent magnet m is not provided may be employed. This electrode structure will be explained with reference to FIG. 9C.

FIG. 9C illustrates an electrode structure in a case where a fabric material is provided on the electric power transmission electrode 21, as an example of the method not employing the permanent magnet m employed in the electrode structure. For example, the fabric material is preferably a material having a surface constituted by raised nap, similarly to rugs and carpets, for example.

As described above, since the atmospheric pressure plasma is employed as the plasma source in the present embodiment, by increasing the introduced amount of the gas G, it is possible to create a state in which only the electron temperature is high, while hardly raising the molecular temperature of the gas G. It is thereby possible to prevent damage to the fabric material accompanying a rise in the molecular temperature, as well as the electron density in the gap of the fabric material being able to be increased; therefore, the junction capacitance Cc formed by the electric power transmission electrode 21 and the electric power reception electrode 22 can be increased.

It should be noted that the insulating property of the fabric material is not particularly limited. It may have insulating property or may have conductive property. In addition, a configuration may be assumed in which a conductive fabric material is bonded to a metal plate constituting the electric power transmission electrode 21, and the periphery of the conductive fabric material is coated with a material having insulating property.

Figure 10A:
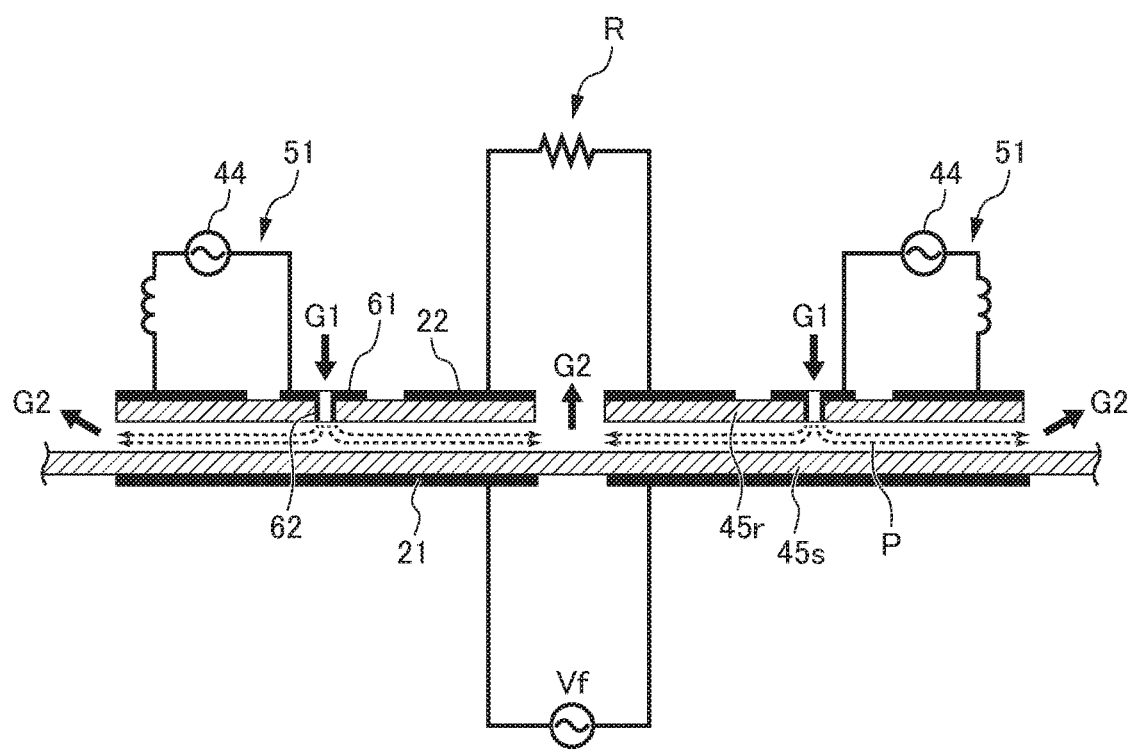
FIGS. 10A and 10B are figures illustrating a configuration example of an electric field coupling electric power transmission circuit to which the present invention is applied.
Figure 10B:
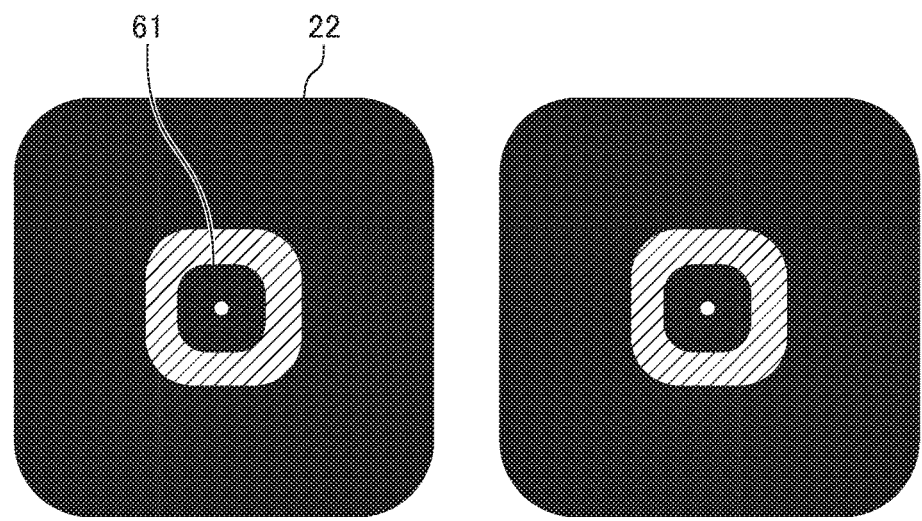

FIGS. 10A and 10B are diagrams showing a configuration example of an electric field coupling electric power transmission circuit to which the present invention is applied. FIG. 10A is a diagram schematically illustrating an overview of a cross-sectional configuration of an electric field coupling electric power transmission circuit to which the present invention is applied. FIG. 10B is a top view of the circuit exemplified in FIG. 10A.

In the example of the electric field coupling electric power transmission circuit exemplified in FIGS. 10A and 10B, a pair of through-hose electrodes 61 and electric power reception electrodes 22 having plasma generation sources 51 are arranged so as to be side by side, and a pair of the electric power transmission electrodes 21 are arranged so as to face this, whereby a pair of junction capacitances Cc are formed. It should be noted that the insulating layer 45s is coated on each of the electric power transmission electrodes 21, the insulating layer 45r is coated on each of the electric power reception electrodes 22 and the through-hose electrodes 61, and the central portion of the through-hose electrode 61 is penetrated by a through-hose 62. In addition, the respective electric power transmission electrodes 21 are connected via the insulating layer 45s coating the electric power transmission electrodes 21.

An electric power source Vf for contactlessly providing electric power is connected to the electric power transmission electrode 21, and a load R is connected to the electric power reception electrode 22. With such a configuration, when a voltage is applied by the high-voltage high-frequency electric power source 44, a plasma P is generated in the space between the electric power transmission electrode 21 and the electric power reception electrode 22. At this occasion, when the gas G1 is introduced from the through-hose 62 of the through-hose electrode 61, the plasma P spreads throughout the space between the electric power transmission electrode 21 and the electric power reception electrode 22, and, the neutralized gas G2 is ultimately discharged from the end portions of the space between the electric power transmission electrode 21 and the electric power reception electrode 22. Although not illustrated in FIGS. 10A and 10B, a configuration in which direct current is outputted may be established by providing a rectifying circuit and a smoothing circuit to the load R.

In addition, each of the electrodes at the electric power reception side has a circuit including a high-voltage high-frequency electric power source 44 for generating the plasma P between the electric power reception electrode 22 and the through-hose electrode 61 arranged to be insulated at the center; however, this circuit is a circuit independent from the electric power transmission circuit. It should be noted that a configuration may be established in which a part of the electric power received through the junction capacitance Cc is used as the electric power for generating the plasma P.

It should be noted that, in the example shown in FIGS. 10A and 10B, the circuit of FIG. 3A is employed as the circuit for electric field coupling however, this is merely an example. As described above, any one of the circuits shown in FIGS. 3B to 3T may be employed. In addition, in the example shown in FIGS. 10A and 10B, a configuration is assumed that provides the circuit for generating the plasma P to the electric power reception unit 2; however, it may be designed to assume a configuration providing this circuit to the electric power transmission unit 1.

Next, a method for maintaining the space (interval) between the electric power transmission electrode 21 and the electric power reception electrode 22 (hereinafter referred to as a "floating method") will be explained. The floating method roughly maintains an interval by employing tires and rails, which are additionally provided, and when setting free the electrode at the electric power reception side, it is possible to adopt at least any one of the following floating methods (a) to (f) as the floating method, for example.

More specifically, it is possible to employ at least one among: (a) a method of measuring the distance using a sensor and maintaining the position of the electrode with an actuator; (b) a method of floating the upper electrode with air pressure from the introduction port of the gas G; (c) a method of maintaining the interval according to an electrostatic method; (d) a method of maintaining the interval according to a magnetic method; (e) a method of maintaining the interval by using ultrasonic floating force; and (f) a method of maintaining the interval according to magnetic and mechanical methods by rotating the magnet at a high speed.

Further, it is possible to employ a method of causing to float by directly applying force between the electric power transmission electrode 21 and the electric power reception electrode 22, without using other maintaining methods such as tires and rails. It should be noted that, in this case, it is possible to jointly use at least one of the aforementioned floating methods (a) to (f).

Figure 11:
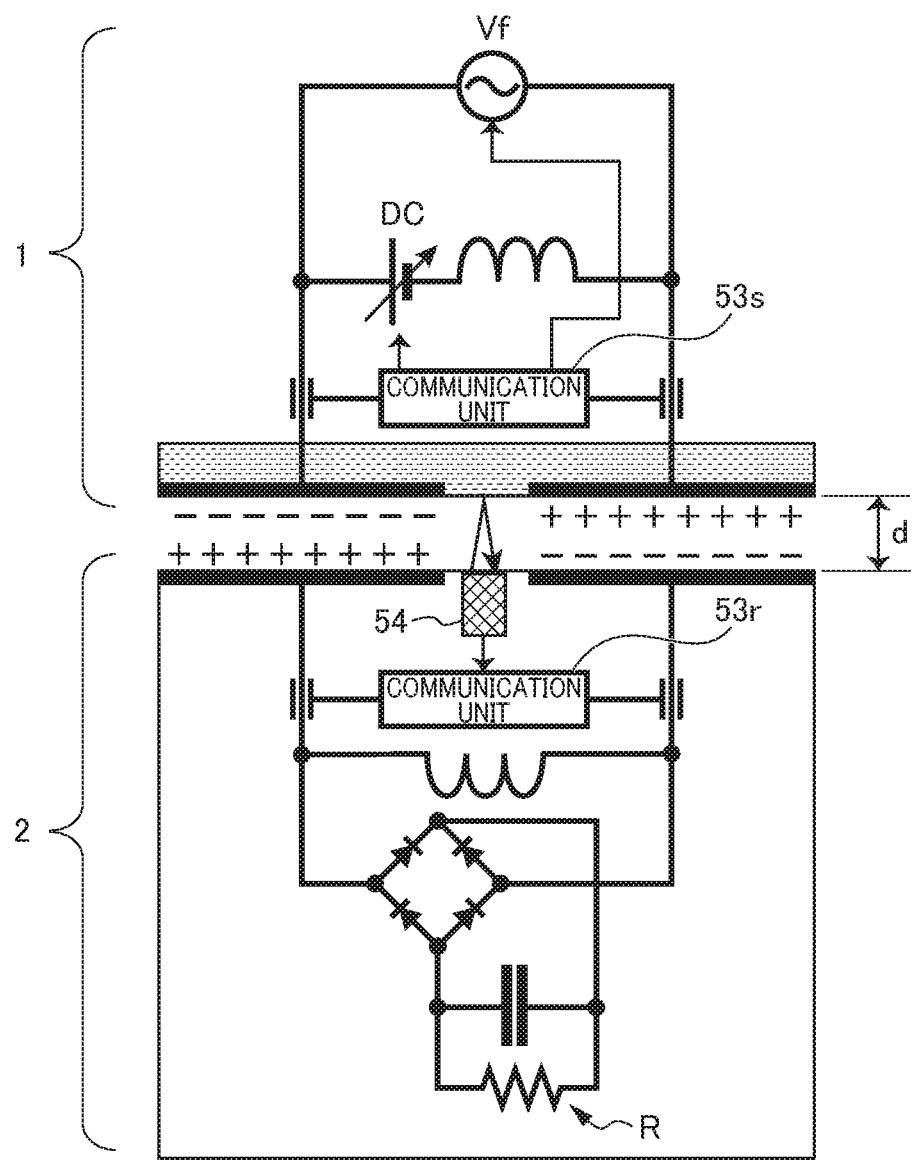
FIG. 11 is a figure for explaining, as a method for maintaining an interval between an electric power transmission electrode and an electric power reception electrode, an example of a method for maintaining the interval by an electrostatic method.

Among the aforementioned floating methods, FIG. 11 is a figure for explaining an example of a method of maintaining the interval according to the electrostatic method which is the floating method (c). More specifically, FIG. 11 illustrates, as an example of a floating method, a method in which a mobile body (electric power reception unit 2) is suspended by way of electrostatic attraction with an electrostatic force d from an electric power transmission rail (electric power transmission unit 1) provided above. More specifically, when the data of a distance sensor 54 attached to the mobile body (electric power reception unit 2) suspended with the electrostatic force d is sent to the electric power transmission rail (electric power transmission unit 1), the DC voltage is made to vary. It thereby becomes a configuration in which the interval between the electric power transmission rail (electric power transmission unit 1) and the mobile body (electric power reception unit 2) is maintained in an optimum state.

In the example of FIG. 11, so long as being a communication environment where a sufficient transmission speed is maintained, no problems will arise in the response performance for adjusting the interval between the electric power transmission rail (electric power transmission unit 1) and the mobile body (electric power reception unit 2) by going through the communication units 53s and 53r. However, in order to ensure the response performance, it may be configured so as to cause the DC voltage to directly change by arranging a separate sensor at the side of the electric power transmission rail (electric power transmission unit 1). In addition, it may be configured to supply electric power by using the electrode used for the electrostatic attraction as an electrode for the electric power supply with the electric field coupling as is.

Further, by insulation treating the surfaces of the electric power transmission electrode 21 and the electric power reception electrode 22, in which the electric powers are opposing due to the electrostatic attraction, it may assume a configuration that allows plasma to be generated in the space between the electric power transmission electrode 21 and the electric power reception electrode 22 (the space in which the electrostatic force d is generated).

Although it may be configured to employ the method described with reference to FIGS. 4A to 4C or FIG. 5 as the method for generating the plasma, for example, a method for generating the plasma may be employed by causing ultraviolet laser (vacuum ultraviolet) to be reflected multiple times between the electrodes (Fabry-Perot resonance). It should be noted that, in a case of using the ultraviolet laser to generate the plasma, ultraviolet light is absorbed by the insulating layer. Therefore, it may be configured to employ a method that provides parallel flat plate aluminum surfaces (mirror polished) on a gas introduction port which is different from the electrode surfaces coated with the insulating layer, and generates plasma by causing Fabry-Perot resonance on the parallel flat plate aluminum surfaces to generate plasma, so that the plasma is generated on the electrode surfaces facing each other. In other words, the method can be said to be a method that performs the plasma generation method of FIGS. 4A to 4C with a ultraviolet laser.

It should be noted that the present invention is not limited to the above embodiment, and that modifications, improvements, and the like within the scope that can achieve the object of the present invention are also encompassed by the present invention.

For example, in the examples shown in FIGS. 5 to 10B, it is a configuration establishing the electrode disposed at the upper part of the figures as the electric power reception electrode, and establishing the electrode disposed at the lower part of the figures as the electric power transmission electrode; however, this is merely an illustrative example, and is not particularly limited thereto. More specifically, it may be made to employ a configuration establishing the electrode disposed at the upper part of the figures as the electric power transmission electrode, and establishing the electrode disposed at the lower part of the figures as the electric power reception electrode.

In summary, it is sufficient for the electric power supply system to which the present invention is applied to have the following such configuration, and it is possible to adopt various embodiments in various modes, including aforementioned various embodiments.

More specifically, the electric power supply system to which the present invention is applied includes:

an electric power transmission electrode for transmitting electric power from an electric power source (for example, electric power transmission electrode 21 of FIG. 2);

an electric power reception electrode disposed so as to contactlessly face the electric power transmission electrode to form a junction capacitance, the electric power reception electrode receiving the electric power transmitted from the electric power transmission electrode through the junction capacitance (for example, electric power reception electrode 22 of FIG. 2); and a plasma generation unit (for example, the plasma generation unit 41 of FIGS. 4A to 4C) for generating a plasma in a space between the electric power transmission electrode and the electric power reception electrode in which the junction capacitance is formed (for example, the space between the electric power transmission electrode 21 and the electric power reception electrode 22 in FIG. 6A).

By generating the plasma between the electric power transmission electrode and the electric power reception electrode (between the electrodes) in this way, the electrostatic capacitance can be increased in the junction capacitance, and even if there is some gap interval, the electric power can be transmitted efficiently.

In addition, the plasma generation unit includes a high-voltage high-frequency electric power source for generating the plasma (for example, the high-voltage high-frequency electric power source 44 of FIGS. 4A to 4C).

Moreover, it further includes a plasma maintaining unit (for example, the insulating layer 45 of FIG. 5 and the permanent magnet m of FIGS. 7A and 7B) for maintaining the plasma, which was generated in the space between the electric power transmission electrode and the electric power reception electrode by the plasma generation unit, in the space between the electric power transmission electrode and the electric power reception electrode.

Additionally, the plasma maintaining unit includes a dielectric (for example, the insulating layer 45 of FIG. 5) having a function of maintaining this plasma in the space between the electric power transmission electrode and the electric power reception electrode by preventing migration of electrons constituting the plasma generated in the space by the plasma generation unit.

Furthermore, the plasma maintaining unit forms a magnetic field in the space between the electric power transmission electrode and the electric power reception electrode (for example, the permanent magnet m of FIGS. 7A and 7B), and change a travelling direction of positive ions and electrons constituting the plasma generated in the space by the plasma generation unit, thereby maintaining this plasma in the space.

Since the electric field between the electrodes can thereby be confined in the central portion by guiding with the plasma, the electric power can be contactlessly supplied while the junction capacitance is increased. In addition, electromagnetic wave radiation to the outside can also be reduced.

In addition, it further includes a reheating unit (for example, the reheating unit 52 of FIG. 5) for reheating, with microwaves or ultraviolet rays, the plasma generated by the plasma generation unit.

The performance of the plasma can thereby be improved.

EXPLANATION OF REFERENCE NUMERALS

1 . . . electric power transmission unit
2 . . . electric power reception unit
11 . . . parallel resonance circuit
12 . . . transformer
14 . . . parallel resonance circuit
15 . . . transformer
21 . . . electric power transmission electrode
22, 22a, 22b . . . electric power reception electrode
23 . . . contactless electric power transmission track
31 . . . plasma emission source
41 . . . plasma generation unit
42 . . . needle electrode
43, 43a, 43b . . . cylindrical electrode
44 . . . high-voltage high-frequency electric power source
45, 45s, 45r . . . insulating layer
46 . . . heating coil
51 . . . plasma generation source
52 . . . reheating unit
53, 53s, 53r . . . communication unit
54 . . . distance sensor
61 . . . through-hose electrode
62 . . . through-hose
c . . . positive ion
e . . . electron
f . . . fabric material
G, G1, G2 . . . gas
HS, HN . . . magnetic field
M . . . microwave
m, mr, ms . . . permanent magnet
P . . . plasma
U . . . uncharged particles

The invention claimed is:

1. An electric power supply system to which an electric field coupling electric power transmission technology is applied, the electric power supply system comprising:
an electric power transmission electrode for transmitting electric power from an electric power source;
an electric power reception electrode that is disposed so as to contactlessly face the electric power transmission electrode to form a junction capacitance, and receives the electric power transmitted from the electric power transmission electrode through the junction capacitance; and
a plasma generation unit for generating a plasma in a space between the electric power transmission electrode and the electric power reception electrode in which the junction capacitance is formed.

2. The electric power supply system according to claim 1, wherein the plasma generation unit includes a high-voltage high-frequency electric power source for generating the plasma.

3. The electric power supply system according to claim 2, wherein the plasma generation unit further includes a reheating function for reheating, with microwaves or ultraviolet rays, the plasma generated by the plasma generation unit.

4. The electric power supply system according to claim 1, further comprising a plasma maintaining unit for maintaining, in the space between the electric power transmission electrode and the electric power reception electrode, the plasma generated in the space between the electric power transmission electrode and the electric power reception electrode by the plasma generation unit.

5. The electric power supply system according to claim 4, wherein the plasma maintaining unit includes a dielectric having a function of maintaining the plasma in the space between the electric power transmission electrode and the electric power reception electrode, by preventing the plasma generated in the space by the plasma generation unit from being lost due to transfer of electrons from the electric power transmission electrode and the electric power reception electrode.

6. The electric power supply system according to claim 4, wherein the plasma maintaining unit maintains the plasma in the space by forming a magnetic field in a peripheral portion of the space between the electric power transmission electrode and the electric power reception electrode, and changing a travelling direction of positive ions and electrons constituting the plasma generated in the space by the plasma generation unit.

* * * * *